(12) United States Patent
Melen et al.

(10) Patent No.: US 12,071,148 B2
(45) Date of Patent: Aug. 27, 2024

(54) SWITCHING DECISION FOR VEHICLE COMPUTATIONAL OFFLOADING TO ROADSIDE EDGE SERVER

(71) Applicant: Toyota Motor Engineering & Manufacturing North America, Inc., Plano, TX (US)

(72) Inventors: Roger Melen, Mountain View, CA (US); Dawei Chen, Mountain View, CA (US); BaekGyu Kim, Mountain View, CA (US)

( * ) Notice: Subject to any disclaimer, the term of this patent is extended or adjusted under 35 U.S.C. 154(b) by 54 days.

(21) Appl. No.: 16/827,451

(22) Filed: Mar. 23, 2020

(65) Prior Publication Data

US 2021/0291851 A1    Sep. 23, 2021

(51) Int. Cl.
| | | |
|---|---|---|
| *B60W 50/06* | (2006.01) | |
| *B60W 50/08* | (2020.01) | |
| *G07C 5/00* | (2006.01) | |
| *G08G 1/0968* | (2006.01) | |

(52) U.S. Cl.
CPC ............ *B60W 50/06* (2013.01); *G07C 5/008* (2013.01); *B60W 50/085* (2013.01); *G08G 1/096811* (2013.01)

(58) Field of Classification Search
CPC ....... G08G 1/096811; G08G 1/096816; G08G 1/096822; B60W 50/06; B60W 2050/065; G05D 1/0011; G05D 1/0022; G05D 1/0027

See application file for complete search history.

(56) References Cited

U.S. PATENT DOCUMENTS

| | | | |
|---|---|---|---|
| 9,672,734 B1 | 6/2017 | Ratnasingam | |
| 10,224,569 B2 * | 3/2019 | Tutusaus | ............... H01M 4/466 |
| 10,440,096 B2 | 10/2019 | Sabella et al. | |
| 2008/0168044 A1 * | 7/2008 | Barron | ................ G06F 11/3419 |

(Continued)

OTHER PUBLICATIONS

Lee, et al., "Vehicular Cloud Networking: Architecture and Design Principles," IEEE Communications Magazine 52(2), Feb. 2014, pp. 148-155.

(Continued)

*Primary Examiner* — Russell Frejd
*Assistant Examiner* — Sara J Lewandroski
(74) *Attorney, Agent, or Firm* — Burbage Law, P.C.; Jon-Michael Burbage (57) ABSTRACT

The disclosure includes embodiments that provide a switching decision for vehicle computational offloading to a roadside edge server. A method includes causing a sensor set of a connected vehicle to determine a current driving context of the connected vehicle. The method includes comparing the current driving context to a set of historical data to determine a predicted latency for using offboard computing resources of an edge server. The method includes determining that the predicted latency for using the offboard computing resources satisfies a threshold for the predicted latency. The method includes executing a switching decision that includes deciding to use the offboard computing resources of the edge server. The method includes causing the edge server to wirelessly provide digital data generated by the edge server responsive to a calculation. The method includes modifying an operation of the onboard vehicle computer based on the digital data.

20 Claims, 3 Drawing Sheets

(56) References Cited

U.S. PATENT DOCUMENTS

| | | | | |
|---|---|---|---|---|
| 2010/0319005 | A1* | 12/2010 | Erignac | G06F 9/52 |
| | | | | 719/315 |
| 2015/0278331 | A1* | 10/2015 | Blea | G06F 11/1464 |
| | | | | 707/610 |
| 2016/0371014 | A1* | 12/2016 | Roberts | G06F 3/0688 |
| 2018/0146323 | A1 | 5/2018 | Tseng et al. | |
| 2018/0241810 | A1 | 8/2018 | Lerzer et al. | |
| 2018/0242115 | A1* | 8/2018 | Kim | H04W 4/40 |
| 2018/0300964 | A1* | 10/2018 | Lakshamanan | G05D 1/0088 |
| 2019/0047581 | A1* | 2/2019 | Bai | G06F 9/5027 |
| 2019/0050318 | A1* | 2/2019 | Beltman | G06F 11/3428 |
| 2019/0050718 | A1* | 2/2019 | Tickoo | G06N 3/063 |
| 2019/0173753 | A1* | 6/2019 | Correia e Costa | H04L 41/0823 |
| 2019/0234752 | A1* | 8/2019 | Volos | G01C 21/3492 |
| 2019/0354111 | A1* | 11/2019 | Cheng | G05D 1/0027 |
| 2020/0110908 | A1* | 4/2020 | Hulton | G06F 21/76 |
| 2020/0272509 | A1* | 8/2020 | Wright | G06F 9/5038 |
| 2020/0280827 | A1* | 9/2020 | Fechtel | H04W 8/08 |
| 2021/0114616 | A1* | 4/2021 | Altman | H04W 36/00837 |

OTHER PUBLICATIONS

Jiru, et al., "Data Aggregation in VANETs: A Generalized Framework for Channel Load Adaptive Schemes," 39th Annual IEEE Conference on Local Computer Networks, 2014, pp. 394-397.

* cited by examiner

SWITCHING DECISION FOR VEHICLE COMPUTATIONAL OFFLOADING TO ROADSIDE EDGE SERVER

BACKGROUND

The specification relates to a switching decision for vehicle computational offloading to a roadside edge server.

Edge computing is an emerging technology for connected vehicles. Edge computing may soon be implemented at strategically important roadside locations.

Edge computing is implemented by installing an edge server in a roadside unit ("RSU"); the edge server then optionally communicates with a cloud server.

Edge computing is beneficial to connected vehicles for various reasons, including, for example: (1) expanding the computational ability of vehicle's onboard computer systems by allowing them to access the computational resources of the edge server, cloud server, and/or other vehicles; (2) allowing vehicles to share important data with one another [e.g., sensor data, future vehicle decisions, any other important digital data which can be shared among vehicles]; and (3) allowing vehicles to participate in other vehicle cloudification.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: causing a sensor set of a connected vehicle to determine a current driving context of the connected vehicle; comparing, by an onboard vehicle computer of the connected vehicle, the current driving context to a set of historical data to determine a predicted latency for using offboard computing resources of an edge server which is remote from the connected vehicle, where the set of historical data describes real-world historical latencies for using the offboard computing resources in a set of different driving contexts; determining that the predicted latency for using the offboard computing resources satisfies a threshold for the predicted latency; executing a switching decision that includes deciding to use the offboard computing resources of the edge server based on the comparing of the current driving context to the set of historical data and the determining that the threshold for the predicted latency is satisfied; causing, responsive to the switching decision, the edge server to wirelessly provide digital data generated by the edge server responsive to a calculation; and modifying an operation of the onboard vehicle computer based on the digital data generated by the calculation and provided to the connected vehicle. Other embodiments of this aspect include corresponding computer systems, apparatus, and computer programs recorded on one or more computer storage devices, each configured to perform the actions of the methods.

Implementations may include one or more of the following features. The method where the edge server executes a separate instance of the switching decision and a consensus between the switching decisions of the onboard vehicle computer and the edge server is required in order for the calculation to be executed by the edge server. The method further including determining whether the calculation improved the operation of the onboard vehicle computer. The method further including updating the historical data responsive to determining that the calculation did not improve the operation of the onboard vehicle computer so that a future switching decision is improved. The method further including determining an actual latency resulting from the switching decision. The method further including determining whether the actual latency is substantially equal to the predicted latency. The method further including updating the historical data responsive to determining that the actual latency is not substantially equal to the predicted latency so that a future switching decision is improved. The method where the digital data describes a sensor measurement recorded by a remote vehicle. The method where the digital data describes an output of a computational process executed by the edge server for the connected vehicle. Implementations of the described techniques may include hardware, a method or process, or computer software on a computer-accessible medium.

One general aspect includes a computer program product installed in an onboard unit of a connected vehicle, the computer program product including codes and routines that are operable, when executed by the onboard unit, to cause the onboard unit to execute routines including: causing a sensor set of a connected vehicle to determine a current driving context of the connected vehicle; comparing, by an onboard vehicle computer of the connected vehicle, the current driving context to a set of historical data to determine a predicted latency for using offboard computing resources of an edge server which is remote from the connected vehicle, where the set of historical data describes real-world historical latencies for using the offboard computing resources in a set of different driving contexts; determining that the predicted latency for using the offboard computing resources satisfies a threshold for the predicted latency; executing a switching decision that includes deciding to use the offboard computing resources of the edge server based on the comparing of the current driving context to the set of historical data and the determining that the threshold for the predicted latency is satisfied; causing, responsive to the switching decision, the edge server to wirelessly provide digital data generated by the edge server responsive to a calculation; and modifying an operation of the onboard vehicle computer based on the digital data generated by the calculation and provided to the connected vehicle. Other embodiments of this aspect include corresponding computer systems, apparatus, and computer programs recorded on one or more computer storage devices, each configured to perform the actions of the methods.

Implementations may include one or more of the following features. The computer program product where the edge server executes a separate instance of the switching decision and a consensus between the switching decisions of the onboard vehicle computer and the edge server is required in order for the calculation to be executed by the edge server. The computer program product further including determining whether the calculation improved the operation of the onboard vehicle computer. The computer program product further including updating the historical data responsive to determining that the calculation did not improve the operation of the onboard vehicle computer so that a future switching decision is improved. The computer program product further including determining an actual latency resulting from the switching decision. The computer program product further including determining whether the actual latency is substantially equal to the predicted latency. The computer program product further including updating the historical data responsive to determining that the actual latency is not substantially equal to the predicted latency so that a future switching decision is improved. The computer program product where the digital data describes a sensor measurement recorded by a remote vehicle. The computer program product where the digital data describes an output of a computational process executed by the edge server for the connected vehicle. Implementations of the described techniques may include hardware, a method or process, or computer software on a computer-accessible medium.

One general aspect includes a system of a connected vehicle including: an onboard vehicle computer communicatively coupled to a non-transitory memory and a sensor set of the connected vehicle, where the onboard vehicle computer is operable to retrieve computer-executable code from the non-transitory memory which is operable, when executed by the onboard vehicle computer, to cause the onboard vehicle computer to: cause the sensor set of a connected vehicle to determine a current driving context of the connected vehicle; compare, by the onboard vehicle computer, the current driving context to a set of historical data to determine a predicted latency for using offboard computing resources of an edge server which is remote from the connected vehicle, where the set of historical data describes real-world historical latencies for using the offboard computing resources in a set of different driving contexts; determine that the predicted latency for using the offboard computing resources satisfies a threshold for the predicted latency; execute a switching decision that includes deciding to use the offboard computing resources of the edge server based on the comparing of the current driving context to the set of historical data and the determining that the threshold for the predicted latency is satisfied; and cause, responsive to the switching decision, the edge server to wirelessly provide digital data generated by the edge server responsive to a calculation. The system also includes modify an operation of the onboard vehicle computer based on the digital data generated by the calculation and provided to the connected vehicle. Other embodiments of this aspect include corresponding computer systems, apparatus, and computer programs recorded on one or more computer storage devices, each configured to perform the actions of the methods.

Implementations may include one or more of the following features. The system where the edge server executes a separate instance of the switching decision and a consensus between the switching decisions of the onboard vehicle computer and the edge server is required in order for the calculation to be executed by the edge server. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Described herein are embodiments of a switching system that is operable to provide a switching decision for vehicle computational offloading to a roadside edge server. In some embodiments, the switching system includes software installed on a connected vehicle. The switching system includes codes and routines that are operable, when executed by a processor, to cause the processor to determine the current context of the connected vehicle. Over time the switching system builds historical data that describes whether it would be better to use onboard resources of the connected vehicles or the resources of an edge server for different contexts.

In some embodiments, the historical data may be used to build a lookup table.

In some embodiments, the switching system uses the historical data/lookup table to determine, based on the current context of the connected vehicle relative to the historical data/lookup table, whether to use (1) the onboard resources of the connected vehicle or (2) the resources of the edge server. This decision is referred to herein as a "switching decision."

In some embodiments, the switching decision considers a set of factors when determining whether to implement the switching decision. For example, these factors include, among others, one or more of the following: the time sensitivity of the vehicle's current context (e.g., is it making a safety critical decision?); and the latency expected by using the resources of the edge server versus the quality of the decision that would be made by the vehicle if it relied solely on its own onboard resources.

Example General Method

In some embodiments, the switching system includes code and routines that are operable, when executed by the onboard unit, to cause the onboard unit to execute one or more steps of the following example general method:

Step 1: The switching system of the ego vehicle collects historical data. The historical data is digital data that describes one or more of the following types of information about a switching decision made by the switching system: sensor data including digital data describing the environment at the time that a switching decision was made; whether onboard resources or offboard resources (i.e., the resources of the edge server) where used as the result of the switching decision; for offboard usage, latency information describing the latency of using offboard resources; context data including digital data describing the context of the resource usage (e.g., emergency, non-emergency, other information that describes the context of the usage, etc.); a description of whether the outcome from the switching decision was successful; etc. In some embodiments, the context data is a combination of the sensor data and the context information described above. An example of the context data according to some embodiments includes the context data 184 depicted in FIG. 1.

The context data may describe various types of context which affect the vehicle which includes the switching system. For example, the context data may describe a roadway context of the roadway on which the vehicle travels (e.g.: weather conditions; whether the roadway is dry, icy, or wet; the lighting conditions; whether the roadway is crowded; how many vehicles are traveling in some or all of the lanes of the roadway, etc.), a driving context of the vehicle (e.g., emergency situation, non-emergency situation, uncertain about the emergency status of the situation), and a network context of the wireless network which the vehicle uses for V2X communications (e.g.: whether the network is congested; which channels of the V2X radio are congested; the latency of the network; the latency of some or all of the channels; how many other vehicles are attempting to transmit V2X messages via the network; for some or all of the channels, how many other vehicles are attempting to transmit V2X messages via the network, etc.). The contexts described by the context data are a subset of the measurements recorded by the sensor set of the ego vehicle and described by the ego sensor data. In some embodiments, the context data describes any context which is explicit, implicit, inferable, or calculable based on the sensor measurements that are recordable by some or all of the sensors included in the sensor set.

In some embodiments, the information described above for step 1 is outputted to an edge server or a cloud server and these endpoints include a switching system that builds the historical data.

The ego sensor data is an example of the sensor data. In some embodiments, the sensor data is recorded at a time to and the ego sensor data is recorded at a later time ti. These times to and ti may each be form range of times where time to is a beginning of the range and time ti is an end of the range. An example of the ego sensor data includes the ego sensor data 193 depicted in FIG. 1. The remote sensor data 194 depicted in FIG. 1 includes similar elements as the ego sensor data 193 with the difference being that the remote sensor data 194 is recorded by one of the Nth remote vehicle 124 whereas the ego sensor data 193 is recorded by the ego vehicle 123. As used herein, N refers to any positive whole number greater than zero. The Nth remote vehicle 124 may be referred to herein as the "remote vehicle 124."

Step 2: The switching system of the ego vehicle builds a lookup table based on the historical data. The lookup table includes a data structure that organizes the historical data. In some embodiments, the lookup table is a data structure that returns specific instances of the historical data based on queries received from the switching system.

A lookup table is an example of such a data structure in some embodiments. In some embodiments, the lookup table is a database.

In some embodiments, the historical data is outputted to the edge server or the cloud server and these endpoints include a switching system that builds the historical data. An example of the lookup table includes the lookup table 182 depicted in FIG. 1. The lookup table 182 includes the historical data 181 which is organized as a lookup table.

Step 3: The switching system of the ego vehicle cause the sensors of the ego vehicle to collect ego sensor data.

Step 4: The switching system of the ego vehicle determine that a switching decision needs to be made. For example, the sensor data may indicate a scenario where the ego sensor data could be improved by being supplemented by the remote sensor data of the remote vehicles provided that a latency threshold is satisfied.

In another example, the switching decision may be triggered because some vehicular operation may be benefited by a computational service provided by the edge server or cloud computing provided by the edge server and/or the remote vehicles provided that some threshold is satisfied wherein this threshold is described by the threshold.

The threshold data is digital data that describes the threshold. An engineer may determine the threshold described by the threshold data. The threshold may be variable based on the context which is described by the context data. An example of the threshold data includes the threshold data 185 depicted in FIG. 1.

Figure 1:
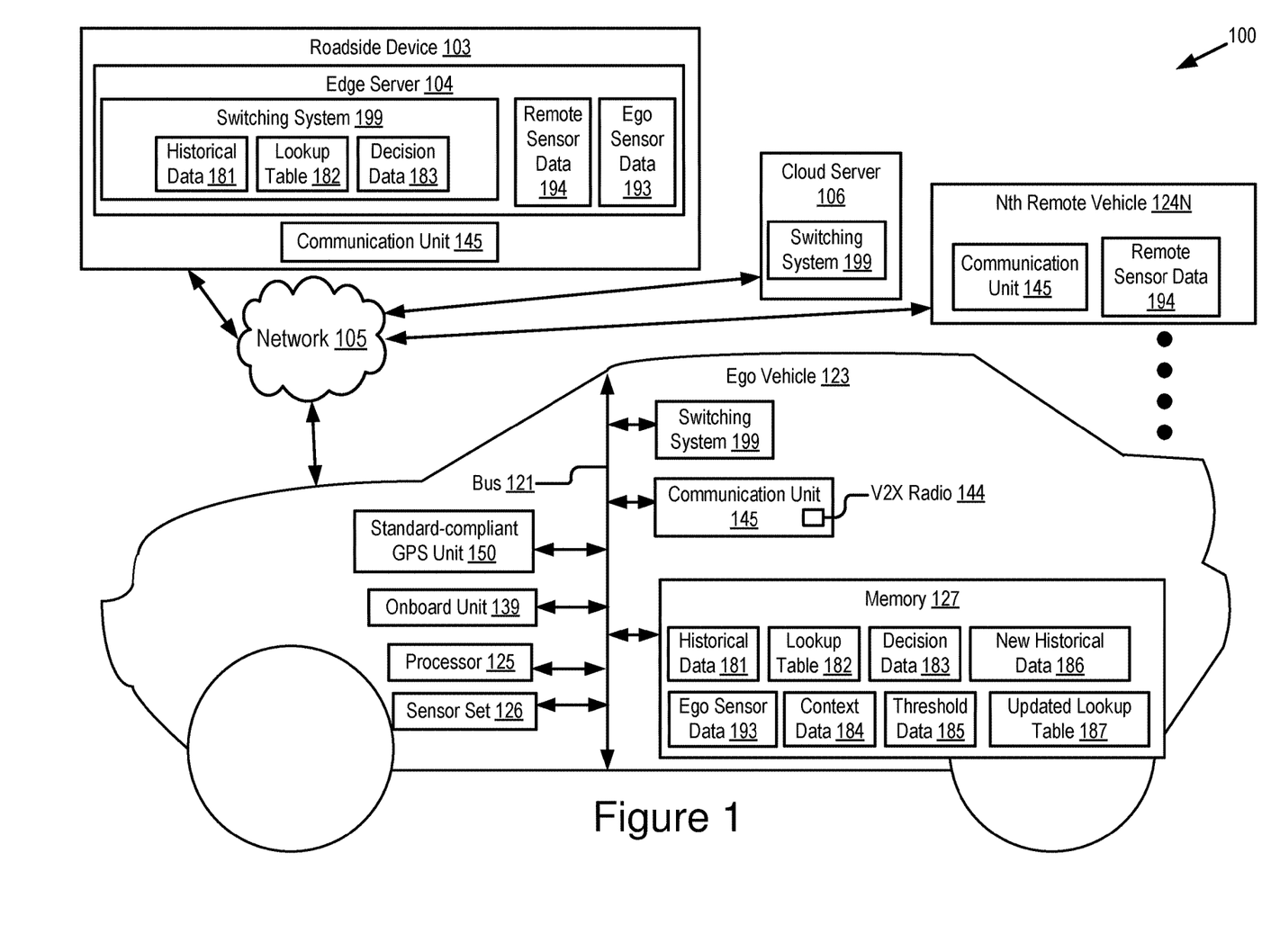
FIG. 1 is a block diagram illustrating an operating environment for a switching system according to some embodiments.

In some embodiments, the threshold data 185 describes a threshold for latency which will trigger the switching system 199 to make a switching decision to switch from using onboard resources to using offboard resources or vice versa. For example, the sensor set 126 includes a network sniffer which records measurements relating to latency for using onboard resources versus offboard resources. The historical data 181 also includes digital data that describes latencies experienced for the use of onboard resources and offboard resources in different contexts. The digital data included in the historical data 181 is organized in a lookup table 182.

In some embodiments, the lookup table 182 is organized to receive queries including current context data 184 and return digital data that described predicted latencies for using onboard resources and/or offboard resources in the context described by the context data 184.

In some embodiments, the switching system uses one or more of the following sources of information when making the switching decision: current network sniffer measurements for predicted latencies for using onboard resources versus using offboard resources at the present time, context data 184 describing a current context of the ego vehicle 123 which is then used to query the lookup table using the context data; and digital data returned from the lookup table 182 response to the query, wherein the digital data that describes the predicted latencies for using onboard resources versus using offboard resources in the present context.

Step 5: The switching system of the ego vehicle determines the context data for the switching decision. The context data describes, for example, whether the current situation for the switching decision is safety critical or some other context for the switching decision.

Step 6: The switching system of the ego vehicle compares the context data to the historical data/lookup table to determine, based on this comparison, whether onboard resources or offboard resources should be used. This step is the switching decision. The outcome of the switching decision is described by the decision data. An example of the decision data includes the decision data 183 depicted in FIG. 1.

In some embodiments, the switching system also considers the threshold data at this step and ensures, for example, that a threshold for latency is satisfied before using offboard resources.

In some embodiments, both the edge server and the ego vehicle have to decide that using offboard resources is best before a decision will be made to use offboard resources.

Step 7: The switching system of the ego vehicle uses either offboard or onboard resources based on the switching decision which was made at step 6.

Step 8: The switching system determines the outcome of the decision made at step 6. For example, the switching system determines answer to the question of whether the switching decision was successful or unsuccessful. The answer to this question may be indicated, for example, based on the quality of the decision made using only ego sensor data [i.e., onboard resource usage] or the latency associated with using local sensor data and also remote sensor data [i.e., offboard resource usage].

Step 9: The switching system of the ego vehicle generates new historical data based on the outcome of the switching decision.

For example, the switching system analyzes the outcome of the switching decision to determine if performance (e.g., predicted latency versus actual latency, or some other measurement of performance) or an outcome was improved by using offboard resources. The new historical data includes digital data that describes conclusions of this analysis.

For example, the new historical data includes digital data that describes one or more of the following: the switching decision that was made at step 7; the context for this switching decision (e.g., the driving context); and whether performance of a communication (e.g., as measured by actual observed latency versus expected latency) or an outcome for the communication (e.g., was the communication actually successful or received on time) was improved by using offboard resources as specified by the switching decision.

An example of the new historical data includes the new historical data 186 depicted in FIG. 1.

Step 10: The switching system of the ego vehicle updates the historical data to include the new historical data generated at step 9. In this way, the example general method provides a feedback loop that continuously improves the quality and accuracy of the historical data.

For example, the switching system 199 updates the historical data 181 depicted in FIG. 1 to include the new historical data 186 so that the historical data 181 describes all the information it previously described as well as the conclusions of the analysis described above for step 9.

Step 11: The switching system of the ego vehicle updates the lookup table based on the updated historical data generated at step 10. For example, the lookup table is updated to include or account for the new historical data which is added to the historical data at step 10. For example, with reference to FIG. 1, the switching system 199 updates the lookup table 182 with the historical data 181 which has been updated to include the new historical data 186. The outcome of this updating is the updated lookup table 187 which includes all the information which the lookup table 182 previously as well as all the new information described by the new historical data 186. The updated lookup table 187 is a data structure that is similar to the lookup table 182 but different in that it includes or accounts for the new historical data 186.

Consensus

In some embodiments, the switching system is also installed in an edge server. For example, see the edge server 104 depicted in FIG. 1 as an element of the roadside device. In some embodiments, some of the functionality of the switching system is executed by the edge server and not the vehicle.

In some embodiments, the switching systems of the edge server and vehicle (e.g., the ego vehicle 123 depicted in FIG. 1) each execute the switching decision and a determination is made about whether there is a consensus between the switching decisions of the vehicle and the edge server; in some embodiments, a consensus is required among the switching decisions of the switching system of the vehicle and the switching system of edge server in order for the vehicle to switch to using the resources of the edge server For example, a consensus among the switching systems of the edge server and the ego vehicle are required in order for the switching system of the ego vehicle to execute step 7 of the example general method described above.

A consensus means that these two switching systems of the ego vehicle and the edge sever have to determine the same switching decision in order for the ego vehicle to execute the switching decision.

DSRC-Equipped Device

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides position data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

In some embodiments, the switching system includes software that is installed in an onboard unit of a vehicle.

Embodiments of the switching system are now described. Referring now to FIG. 1, depicted is a block diagram illustrating an operating environment 100 for a switching system 199 according to some embodiments.

The operating environment 100 may include one or more of the following elements: an ego vehicle 123 (referred to herein as a "vehicle 123" or an "ego vehicle 123"); an Nth remote vehicle 124 (where "N" refers to any positive whole number greater than one); a roadside device 103; and a cloud server 106. These elements of the operating environment 100 are communicatively coupled to one another via a network 105. These elements of the operating environment 100 are depicted by way of illustration. In practice, the operating environment 100 may include one or more of the elements depicted in FIG. 1. The Nth remote vehicle 124 is referred to herein as a "remote vehicle 124" or a "vehicle 124."

In the depicted embodiment, the ego vehicle 123 and the remote vehicle 124 include similar elements. For example, each of these elements of the operating environment 100 include their own processor 125, bus 121, memory 127, communication unit 145, sensor set 126, onboard unit 139, and switching system 199. These elements of the ego vehicle 123 and the remote vehicle 124 provide the same or similar functionality relative to one another. Accordingly, these descriptions will not be repeated in this description.

In the depicted embodiment, the ego vehicle 123 and the remote vehicle 124 each store similar digital data. For example, the memory 127 of the ego vehicle 123 may store the digital data depicted in FIG. 1 as stored by the memory 127 of the ego vehicle 123.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

In some embodiments, one or more of the ego vehicle 123 and the remote vehicle 124 are DSRC-equipped vehicles. For example, the ego vehicle 123 and the remote vehicle 124 each include a standard-compliant GPS unit 150 and a DSRC radio (e.g., the omnidirectional radio 143 is a DSRC radio in embodiments where the ego vehicle 123 is a DSRC-equipped vehicle). The network 105 may include a DSRC communication channel shared among the ego vehicle 123 and the remote vehicle 124.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105.

The ego vehicle 123 includes one or more of the following elements: a processor 125; a sensor set 126; a standard-compliant GPS unit 150; a communication unit 145; an onboard unit 139; a memory 127; and a switching system 199. These elements may be communicatively coupled to one another via a bus 121.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; an advanced driver assistance system ("ADAS system") and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the switching system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 may record sensor measurements that describe the ego vehicle 123 or the physical environment that includes the ego vehicle 123. The sensor data includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the sensor set 126 includes a network sniffer that is operable to record, among other things, the latency of a wireless network such as the network 105. In some embodiments, the network sniffer is operable to predict a latency for using offboard computing resources of the edge server 104 and/or the cloud server 106. In some embodiments, the network sniffer is operable to predict a latency for using the onboard resources of the ego vehicle 123. In some embodiments, the network sniffer is operable to record an actual latency which results from a switching decision. In some embodiments, the network sniffer is operable to output a description of whether the outcome from the switching decision was successful.

In some embodiments, the switching system 199 includes code and routines that are operable, when executed by the processor 125, to cause the processor 125 to execute steps that are consistent with achieving one or more of the following: a predicted latency for using offboard computing resources of the edge server 104; predicted latency for using offboard computing resources of the cloud server 106; a predicted latency for using the onboard resources of the ego vehicle 123; an actual latency which results from a switching decision; and generating a description of whether the outcome from the switching decision was successful.

In some embodiments, a successfulness of a switching decision is determined by the switching system 199 by determining whether the switching decision resulted in a lower latency relative to the alternative decision. For example, if the switching decision is to use offboard resources, whether the actual latency measured by the sensor set 126 is less than the predicted latency for using the onboard resources of the ego vehicle 123.

The sensor set 126 is operable to record sensor data that describes the measurements recorded by one or more of the sensors of the sensor set 126. For example, the sensor set 126 of the ego vehicle 123 is operable to record the ego sensor data 193 and the sensor set 126 of the remote vehicle 124 is operable to record the remote sensor data 194. The ego sensor data 193 includes digital data describing the sensor measurements of the sensor set 126 of the ego vehicle 123 from the perspective of the ego vehicle 123. The remote sensor data 194 includes digital data describing the sensor measurements of the sensor set 126 of the remote vehicle 124 from the perspective of the remote vehicle 124.

In some embodiments, the ego sensor data 193 includes digital data that describes, among other things, one or more of the following: the environment at a time that a switching decision is made; whether onboard resources or offboard resources (i.e., the resources of the edge server 104) where used as the result of the switching decision; for offboard usage, latency information describing the latency of using offboard resources; whether a wireless communication is received by the desired endpoint as a result of the switching decision; and any other sensor measurement that is relevant to assessing the quality or outcome of the switching decision.

In some embodiments, the remote sensor data 194 describes similar information as the ego sensor data 193 although from the perspective of the remote vehicle 124.

In some embodiments, the switching system 199 of the ego vehicle 123 causes the communication unit 145 of the ego vehicle 123 to transmit the ego sensor data 193 to the edge server 104 via the network 105. In some embodiments, the switching system 199 of the remote vehicle 124 causes the communication unit 145 of the remote vehicle 124 to transmit the remote sensor data 194 to the edge server 104 via the network 105.

Accordingly, in some embodiments the edge server 104 includes a non-transitory memory that stores the remote sensor data 194 and the ego sensor data 193. The edge server 104 also includes a non-transitory memory that stores the lookup table 182 and an instance of the decision data 183 described herein. In some embodiments, the decision data 183 of the edge server 104 describes a switching decision made by the switching system 199 of the edge server 104 that may or may not provide consensus for a switching decision made by the switching system 199 of the ego vehicle 123 in some embodiments.

In some embodiments, the sensors of the sensor set 126 are operable to collect sensor data. The sensors of the sensor set 126 include any sensors that are necessary to measure and record the sensor measurements that are necessary for the switching system 199 to provide its functionality.

In some embodiments, the sensor data includes any measurements that are necessary to generate, measure, infer or otherwise determine one or more of the following: the context data 184; the historical data 181, the lookup table 182; the decision data 183; the new historical data 186; and the updated lookup table 187.

As described above, in some embodiments the sensor set 126 is operable to record any sensor measurements that are necessary to generate the context data 184. The context data 184 includes digital data that describes the context of a switching decision or the context in which a switching decision is made by the switching system 199.

For example, in some embodiments, the context data 184 includes digital data that describes one or more of the following: the context of the resource usage (e.g., emergency, non-emergency, other information that describes the context of the usage, etc.); how many vehicles are on a roadway that includes the ego vehicle 123 at the time of a switching decision; an amount of network traffic measured on the network 105 at the time of the switching decision or just before the switching decision is made; a predicted latency for using offboard computing resources of the edge server 104 or the cloud server 106; a predicted latency for using the onboard resources of the ego vehicle 123; an actual latency measured by the sensor set 126 as a result of the switching decision; a description of whether the outcome from the switching decision was successful (i.e., whether the switching decision resulted in a lower latency relative to the alternative decision—for example, if the switching decision is to use offboard resources, whether the actual latency measured by the sensor set 126 is less than the predicted latency for using the onboard resources of the ego vehicle 123); etc.

In some embodiments, the context data 184 is a combination of the sensor measurements and the context information described above.

In some embodiments, the context data 184 describes various types of context which affect the switching decision of the ego vehicle. For example, the context data 184 describes one or more of the following: (1) a roadway context of the roadway on which the ego vehicle 123 travels (e.g.: weather conditions; whether the roadway is dry, icy, or wet; the lighting conditions; whether the roadway is crowded; how many vehicles are traveling in some or all of the lanes of the roadway, etc.); (2) a driving context of the ego vehicle 123 (e.g., emergency situation, non-emergency situation, uncertain about the emergency status of the situation), and (3) a network context of the network 105 (e.g.: whether the network 105 is congested; which channels of the V2X radio 144 are congested; the latency of the network 105; the latency of some or all of the channels of the V2X radio 144; how many other remote vehicles 124 are attempting to transmit V2X messages via the network 105; for some or all of the channels of the V2X radio 144, how many other remote vehicles 124 are attempting to transmit V2X messages via the network 105, etc.). The contexts described herein are examples and not intended to be limiting; the context data 184 may describe any context which affects the switching decision.

In some embodiments, the switching system 199 includes code and routines that are operable to generable historical data 181 and a lookup table 182 (as well as the updated lookup table 187 and the new historical data 186) that include entries that correspond to the contexts described by the context data 184 so that these data and data structures are searchable by the switching system 199 based on queries that include context data 184 describing a current context of a switching decision which the switching system 199 is making or about to make.

In some embodiments, the contexts described by the context data 184 are a subset of the measurements recorded by the sensor set 126 of the ego vehicle 123 and described by the ego sensor data 193. In some embodiments, the context data 184 describes any context which is explicit, implicit, inferable, or calculable based on the sensor measurements that are recordable by some or all of the sensors included in the sensor set 126.

In some embodiments, the switching system 199 includes codes and routines that are operable to analyze the ego sensor data 193 and generate the context data 184 based on analysis of the ego sensor data 193. For example, the switching system 199 is executed by the processor 125 and the switching system 199 causes the processor 125 to analyze the ego sensor data 193 and determine one or more of the following based on the analysis of the ego sensor data 193: one or more roadway contexts; one or more driving contexts; and one or more network contexts.

In some embodiments, a roadway context is a context that describes information about the roadway on which the ego vehicle 123 travels.

In some embodiments, a driving context is a context that describes information about the driving condition of the ego vehicle 123, a safety of the ego vehicle 123 (e.g., whether a collision or near collision is imminent or possibly imminent, or any other factor which affects the safety of the ego vehicle 123, the driver, or some other entity on the roadway).

In some embodiments, a network context is a context that describes information about the network 105 or one or more channels of the network 105.

Examples of roadway contexts, driving contexts, and network contexts are included in the description of the context data 184 provided above.

In some embodiments, the standard-compliant GPS unit 150 includes any hardware and software necessary to make the ego vehicle 123 or the standard-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the standard-compliant GPS unit 150 is operable to provide position data describing the location of the ego vehicle 123 with lane-level accuracy. For example, the ego vehicle 123 is traveling in a lane of a multi-lane roadway. Lane-level accuracy means that the lane of the ego vehicle 123 is described by the position data so accurately that a precise lane of travel of the ego vehicle 123 may be accurately determined based on the position data for this vehicle 123 as provided by the standard-compliant GPS unit 150.

In some embodiments, the standard-compliant GPS unit 150 includes hardware that wirelessly communicates with a GPS satellite (or GPS server) to retrieve position data that describes the geographic location of the ego vehicle 123 with a precision that is compliant with the DSRC standard. The DSRC standard requires that position data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the position data is less than 1.5 meters the switching system 199 described herein may analyze the position data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit which is not compliant with the DSRC standard is unable to determine the location of the ego vehicle 123 with lane-level accuracy.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes one or more of the following: a V2X radio 144. In some embodiments, the V2X radio 144 is a hardware unit that includes one or more transmitters and one or more receivers that is operable to send and receive any type of wireless omnidirectional communication that includes a vehicle such as the ego vehicle 123 as a transmitter or receiver of the omnidirectional communication.

In some embodiments, the V2X radio 144 includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio 144 periodically broadcasts a Basic Safety Message ("BSM message" if singular, or "BSM messages" if plural) as described by the DSRC standard or some similar, derivative, replacement, or competing standard. In some embodiments, the communication unit 145 includes a non-transitory memory which stores digital data that controls the frequency for broadcasting BSM messages. In some embodiments, the non-transitory memory stores a buffered version of the ego sensor data 193 for the ego vehicle 123 so that the ego sensor data 193 for the ego vehicle 123 is broadcast as an element of the BSM messages which are regularly broadcast by the V2X radio 144 (e.g., at an interval of once every 0.10 seconds). An example of the digital data that is included in a BSM message includes some or all of the digital data depicted in FIG. 1 as being stored by the memory 127 of the ego vehicle 123.

In some embodiments, the V2X radio 144 includes any hardware or software which is necessary to make the ego vehicle 123 compliant with the DSRC standards. In some embodiments, the standard-compliant GPS unit 150 is an element of the V2X radio 144.

The memory 127 is a non-transitory storage medium. The memory 127 stores instructions or data that may be executed by the processor 125. The instructions or data include code for performing the techniques described herein.

In some embodiments, the memory 127 is one or more of a dynamic random-access memory (DRAM) device, a static random-access memory (SRAM) device, flash memory, or some other memory device. In some embodiments, the memory 127 includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 stores any or all of the digital data or information described herein.

As depicted in FIG. 1, the memory 127 stores the following digital data: the ego sensor data 193; the historical data 181; the lookup table 182; the context data 184; the decision data 183; the threshold data 185; the new historical data 186; and the updated lookup table 187.

In some embodiments, the memory 127 also stores sensor data and any digital data that is returned from the lookup table 182 (or the updated lookup table 187) responsive to a query.

In some embodiments, the switching system 199 includes code and routines that are operable, when executed by the processor 125, to cause the processor 125 to: execute or activate one or more sensors of the sensor set 126 to cause to record the sensor measurements that are described by the sensor data; and store these sensor measurements as the sensor data in the memory 127.

In some embodiments, the memory 127 also stores message data. Message data is digital data that describes the payload for a wireless message (e.g., a directional communication and/or an omnidirectional communication) transmitted or received by the ego vehicle 123.

The digital data stored by the memory 127 is described above with reference to the example general method, and so, those descriptions will not be repeated here.

In some embodiments, the switching system 199 includes code and routines that are operable, when executed by the processor 125, to execute one or more steps of the example general method described above. In some embodiments, the switching system 199 includes code and routines that are operable, when executed by the processor 125, to execute one or more steps of the method depicted in FIG. 3. In some embodiments, the switching system 199 includes code and routines that are operable to execute one or more steps of the claims as originally filed.

In some embodiments, the switching system 199 is an element of the communication unit 145. In some embodiments, the switching system is not an element of the communication unit 145. In some embodiments, the switching system 199 is stored on the memory 127. In some embodiments, the switching system 199 is an element of the onboard unit 139 or some other onboard vehicle computer (see, e.g., FIG. 2). In some embodiments, the switching system 199 includes a processor 125 and the memory 127.

In some embodiments, the switching system 199 is implemented using hardware including a field-programmable gate array ("FPGA") or an application-specific integrated circuit ("ASIC"). In some other embodiments, the switching system 199 is implemented using a combination of hardware and software.

The remote vehicle 124 includes elements and functionality which are similar to those described above for the ego vehicle 123, and so, those descriptions will not be repeated here. In some embodiments, the ego vehicle 123 and the remote vehicle 124 are located in a same geographic region.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the switching system 199 includes encryption keys for encrypting wireless messages and decrypting the wireless messages described herein.

The remote vehicle 124 includes elements that are similar to the ego vehicle, and so, those descriptions will not be repeated here. The remote vehicle 124 includes a sensor set 126 that generates remote sensor data 194. The remote sensor data 194 includes digital data that describes the measurements recorded by the sensors of the sensor set 126. The remote sensor data 194 describes information that is similar to the information described by the ego sensor data 193, and so, those descriptions will not be repeated here. In some embodiments, the sensor set 126 of the remote vehicle 124 also records context data 184 which is similar to the context data 184 that is recorded by the sensor set 126 of the ego vehicle 123.

In some embodiments, the roadside device 103 is a connected roadside infrastructure device that includes an edge server 104 and is operable to send and receive wireless communications via the network 105. In some embodiments, the roadside device 103 is a device that: (1) includes a communication unit 145, an edge server 104, and a processor 125; and (2) is present in an environment (e.g., a roadway environment) with the ego vehicle 123 and/or the remote vehicle 124.

In some embodiments, the roadside device 103 includes the following elements: a memory 127; a bus 121; a processor 125; a communication unit 145; a sensor set 126; and a switching system 199. These elements of the roadside device 103 provide similar functionality as those described above for the ego vehicle 123, and so, these descriptions will not be repeated here.

In some embodiments, the roadside device 103 is not an element of the vehicular micro cloud.

In some embodiments, the switching decision includes determining whether to offload vehicle functions to the edge server 104 that is included in the roadside device so that the offboard resources of the edge server 104 are used to provide these vehicle functions instead of the onboard resources of the ego vehicle 123, or to handle these vehicle functions using the onboard resources of the ego vehicle 123. The edge server 104 is a hardware-based processor computing device that is configured to serve as a conventional edge server. For example, the edge server 104 is a mainframe, a laptop computer, a desktop computer, router, hardware security system device (e.g., a firewall device or some other security system), or some other hardware-based processor computing device.

The cloud server 106 is a hardware-based processor computing device that is configured to serve as a conventional cloud server 106. For example, the cloud server 106 is a mainframe, a laptop computer, a desktop computer, or some other hardware-based processor computing device. In some embodiments, the switching decision includes determining whether to offload vehicle functions to the cloud server 106 so that the offboard resources of the cloud server 106 are used to provide these vehicle functions instead of the onboard resources of the ego vehicle 123, or to handle these vehicle functions using the onboard resources of the ego vehicle 123.

In some embodiments, the switching system 199 of the edge server 104 and/or the cloud server 106 is operable to provide consensus (or not provide consensus) with the switching decision arrived at by the switching system 199 of the ego vehicle 123. In some embodiments, the switching system 199 of the ego vehicle 123 and the remote vehicle 124 are operable to cause their respective communication units 145 to transmit their sensor data (e.g., the ego sensor data 193 and the remote sensor data 194, respectively) to the edge server 104 and/or the cloud server 106 so that their switching systems 199 can provide their functionality of arriving at a switching decision and then transmitting a V2X message to the ego vehicle 123 including digital data describing their switching decision so that the switching system 199 of the ego vehicle 123 can determine whether or not their is a consensus among these switching decisions.

Figure 2:
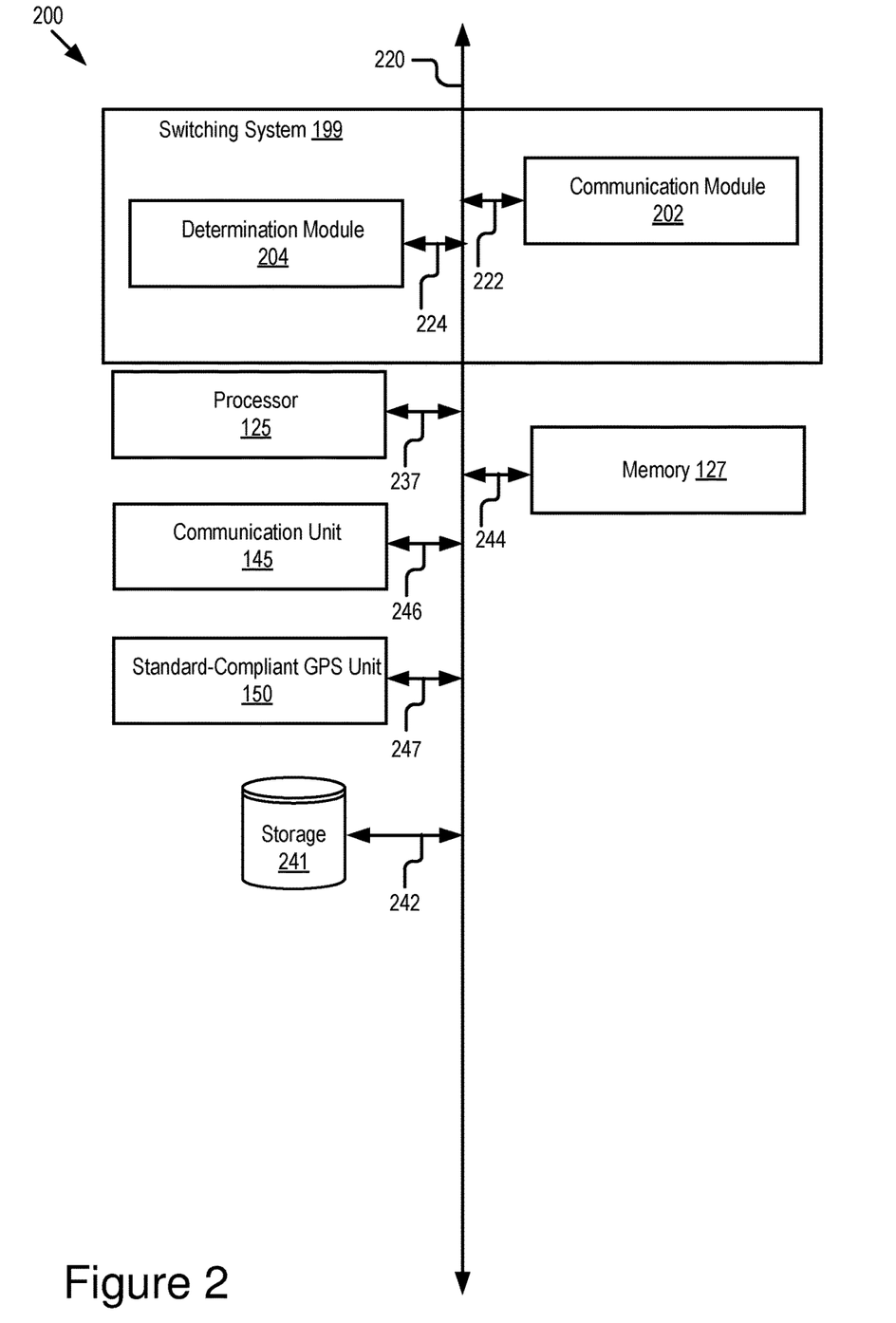
FIG. 2 is a block diagram illustrating an example computer system including a switching system according to some embodiments.

Referring now to FIG. 2, depicted is a block diagram illustrating an example computer system 200 including a switching system 199 according to some embodiments.

In some embodiments, the computer system 200 may include a special-purpose computer system that is programmed to perform one or more steps of one or more of the methods, protocols, and strategies described herein.

In some embodiments, the computer system 200 may include a processor-based computing device. For example, the computer system 200 may include an onboard vehicle computer system of the ego vehicle 123 or the remote vehicle 124.

The computer system 200 may include one or more of the following elements according to some examples: the switching system 199; a processor 125; a communication unit 145; a standard-compliant GPS unit 150; a storage 241; and a memory 127. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The standard-compliant GPS unit 150 is communicatively coupled to the bus 220 via a signal line 247. The storage 241 is communicatively coupled to the bus 220 via a signal line 242. The memory 127 is communicatively coupled to the bus 220 via a signal line 244.

The following elements of the computer system 200 were described above with reference to FIG. 1, and so, these descriptions will not be repeated here: the processor 125; the communication unit 145; the standard-compliant GPS unit 150; and the memory 127.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the switching system 199 includes code and routines that are operable, when executed by the processor 125, to cause the processor 125 to execute one or more steps of one or more of the methods, protocols, and strategies described herein.

In the illustrated embodiment shown in FIG. 2, the switching system 199 includes a communication module 202 and the determination module 204.

The determination module 204 is communicatively coupled to the bus 220 via the signal line 224. In some embodiments, the determination module 204 includes code and routines that are operable, when executed by the processor 125, to execute steps that provide the functionality of the switching system 199. In some embodiments, the determination module 198 includes code and routines that are operable, when executed by the processor 125, to execute one or more steps of the example general method described above. In some embodiments, the determination module 198 includes code and routines that are operable, when executed by the processor 125, to execute one or more steps of the method 300 depicted in FIG. 3. In some embodiments, the determination module 198 includes code and routines that are operable, when executed by the processor 125, to execute one or more steps of the method described by the claims as originally filed. In some embodiments, the determination module 204 includes code and routines that are operable to analyze the payloads received from the edge server and/or the cloud server to determine if their is a consensus among the switching decisions of these endpoints and the ego vehicle.

The communication module 202 can be software including routines for handling communications between the switching system 199 and other components of the computer system 200. In some embodiments, the communication module 202 can be a set of instructions executable by the processor 125 to provide the functionality described below for handling communications between the switching system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the switching system 199 and stores the data in one or more of the storage 241 and the memory 127.

In some embodiments, the communication module 202 may handle communications between components of the switching system 199 or the computer system 200.

Figure 3:
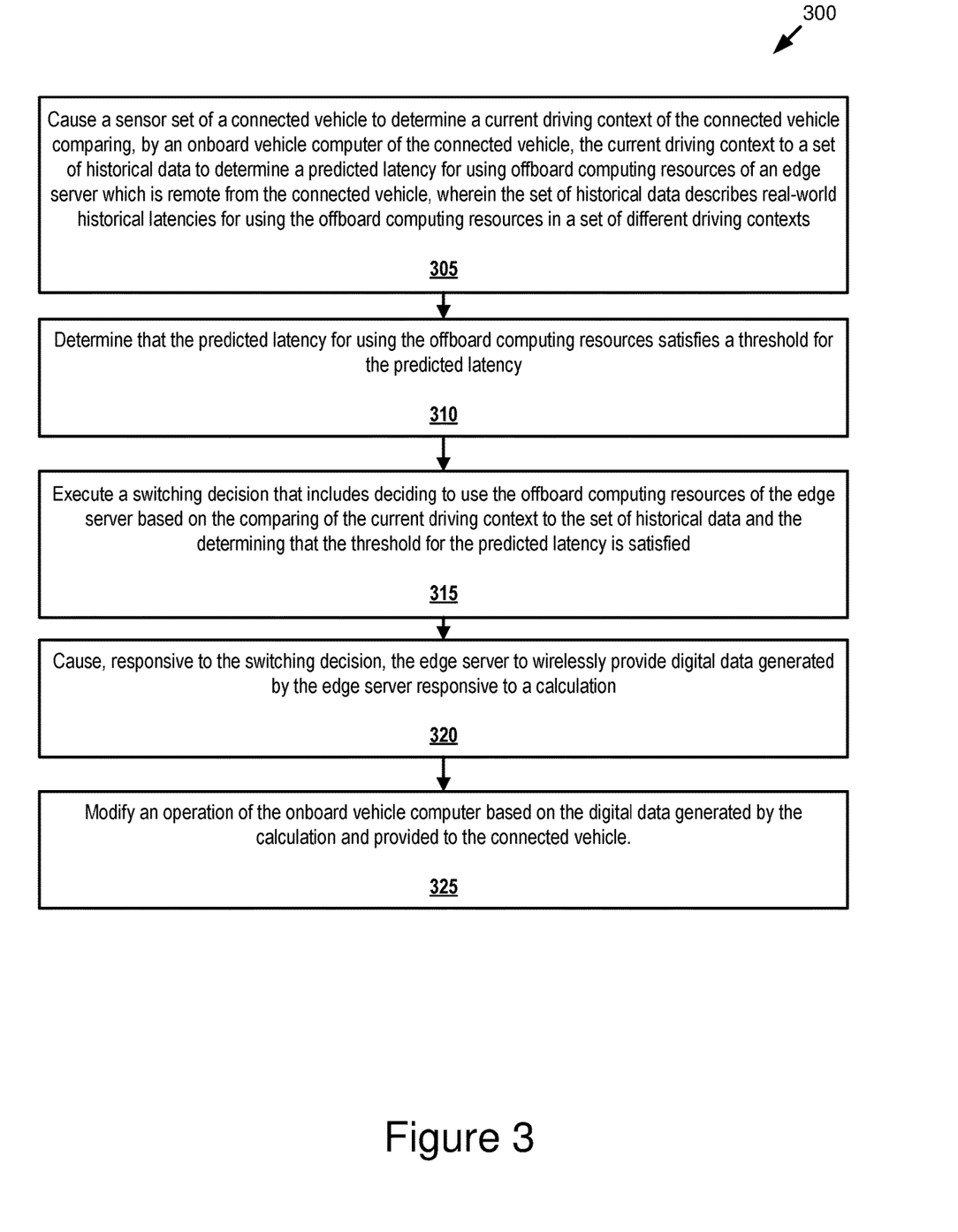
FIG. 3 includes a flowchart of an example method implemented by the switching system according to some embodiments.

Referring now to FIG. 3, depicted is an example method 300 implemented by the switching system according to some embodiments. The steps of the method 300 may be executed in any order, and not necessarily those depicted in FIG. 3. In some embodiments, one or more of the steps are skipped or modified in ways that are described herein or known or otherwise determinable by those having ordinary skill in the art. The method includes steps 305, 310, 315, 320, and 325. In some embodiments, the method 300 is modified to include some or all of the steps described below with reference to the claims. In some embodiments, the method 300 is modified to include some or all aspects of the example general method described above.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
    causing a sensor set of a connected vehicle to determine a current driving context of the connected vehicle;
    comparing, by an onboard vehicle computer of the connected vehicle, the current driving context to a set of historical data to determine a predicted latency for using offboard computing resources of an edge server which is remote from the connected vehicle, wherein the set of historical data describes, for a plurality of historical switching decisions, real-world historical latencies for using the offboard computing resources in a set of different driving contexts and whether using the offboard computing resources was successful on a decision-by-decision basis;
    determining that the predicted latency for using the offboard computing resources satisfies a threshold for the predicted latency;
    executing a switching decision that includes deciding to use the offboard computing resources of the edge server based on the comparing of the current driving context to the set of historical data and the determining that the threshold for the predicted latency is satisfied;

causing, responsive to the switching decision, the edge server to wirelessly provide digital data generated by the edge server responsive to a calculation; and modifying an operation of the onboard vehicle computer based on the digital data generated by the calculation and provided to the connected vehicle.

2. The method of claim 1, wherein the edge server executes a separate instance of the switching decision and a consensus between the switching decisions of the onboard vehicle computer and the edge server is required in order for the calculation to be executed by the edge server.

3. The method of claim 1, wherein the edge server provides the digital data responsive to a calculation and further comprising determining whether the calculation improves the operation of the onboard vehicle computer.

4. The method of claim 3, further comprising updating the historical data responsive to determining that the calculation does not improve the operation of the onboard vehicle computer so that a future switching decision is improved.

5. The method of claim 1, further comprising determining an actual latency resulting from the switching decision.

6. The method of claim 5, further comprising determining whether the actual latency is substantially equal to the predicted latency.

7. The method of claim 6, further comprising updating the historical data responsive to determining that the actual latency is not substantially equal to the predicted latency so that a future switching decision is improved.

8. The method of claim 1, wherein the digital data describes a sensor measurement recorded by a remote vehicle.

9. The method of claim 1, wherein the digital data describes an output of a computational process executed by the edge server for the connected vehicle.

10. A non-transitory computer program product installed in an onboard unit of a connected vehicle, the computer program product including codes and routines that are operable, when executed by the onboard unit, to cause the onboard unit to execute routines including:

comparing a current driving context of the connected vehicle to a set of historical data to determine a predicted latency for using offboard computing resources of an edge server, wherein the set of historical data describes, for a plurality of historical switching decisions, real-world historical latencies for using the offboard computing resources in a set of different driving contexts and whether using the offboard computing resources was successful on a decision-by-decision basis;

determining that the predicted latency for using the offboard computing resources satisfies a threshold for the predicted latency;

executing a switching decision that includes deciding to use the offboard computing resources of the edge server based on the comparing and the determining;

responsive to the switching decision, wirelessly receiving digital data from the edge server; and modifying an operation based on the digital data.

11. The computer program product of claim 10, wherein the edge server executes a separate instance of the switching decision and a consensus between switching decisions of the onboard unit and the edge server is required in order for a calculation to be executed by the edge server.

12. The computer program product of claim 10, wherein the edge server provides the digital data responsive to a calculation and the routines further include determining whether the calculation improves the operation of the onboard unit.

13. The computer program product of claim 12, wherein the routines further include updating the historical data responsive to determining that the calculation does not improve the operation of the onboard unit so that a future switching decision is improved.

14. The computer program product of claim 10, wherein the routines further include determining an actual latency resulting from the switching decision.

15. The computer program product of claim 14, wherein the routines further include determining whether the actual latency is substantially equal to the predicted latency.

16. The computer program product of claim 15, wherein the routines further include updating the historical data responsive to determining that the actual latency is not substantially equal to the predicted latency so that a future switching decision is improved.

17. The computer program product of claim 10, wherein the digital data describes a sensor measurement recorded by a remote vehicle.

18. The computer program product of claim 10, wherein the digital data describes an output of a computational process executed by the edge server for the connected vehicle.

19. A system of a connected vehicle comprising:

an onboard vehicle computer communicatively coupled to a non-transitory memory and a sensor set of the connected vehicle, wherein the onboard vehicle computer is operable to retrieve computer-executable code from the non-transitory memory which is operable, when executed by the onboard vehicle computer, to cause the onboard vehicle computer to:

compare a current driving context of the connected vehicle to a set of historical data to determine a predicted latency for using offboard computing resources of an edge server, wherein the set of historical data describes, for a plurality of historical switching decisions, real-world historical latencies for using the offboard computing resources in a set of different driving contexts and whether using the offboard computing resources was successful on a decision-by-decision basis;

determine that the predicted latency for using the offboard computing resources satisfies a threshold for the predicted latency;

execute a switching decision that includes deciding to use the offboard computing resources of the edge server based on the comparing and the determining;

responsive to the switching decision, wirelessly receiving digital data from the edge server; and modify an operation based on the digital data.

20. The system of claim 19, wherein the edge server executes a separate instance of the switching decision and a consensus between the switching decisions of the onboard vehicle computer and the edge server is required in order for the calculation to be executed by the edge server.

* * * * *